No. 831,920. PATENTED SEPT. 25, 1906.
B. R. AMEND.
ARTIFICIAL HAND FOR PLAYING CHORDS.
APPLICATION FILED OCT. 31, 1905.
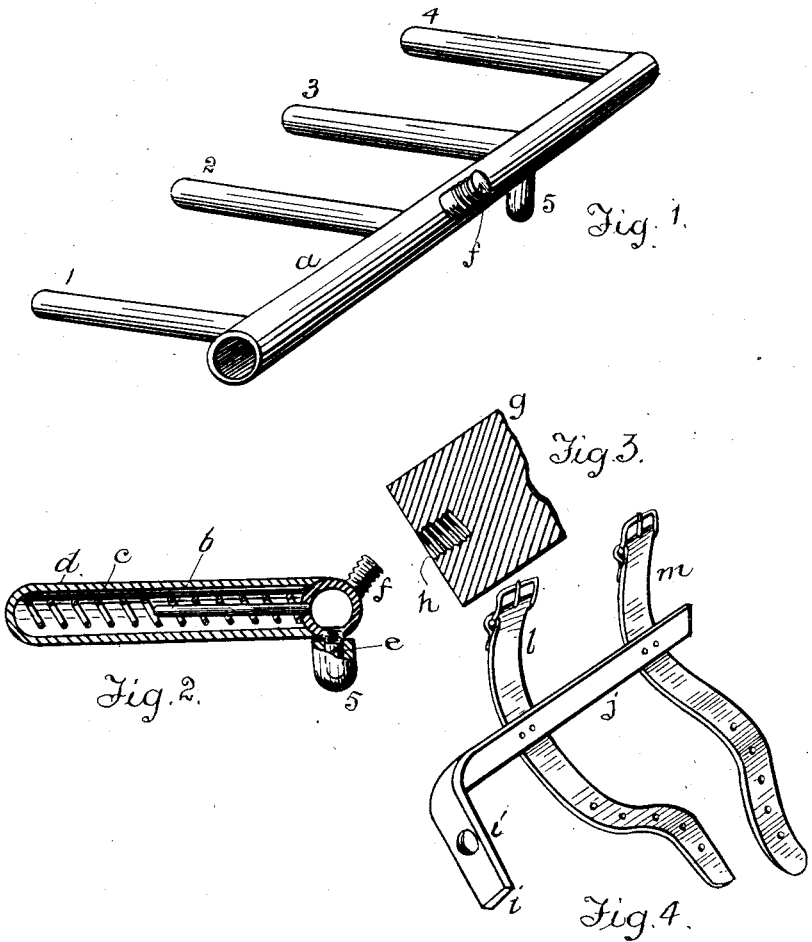
Witnesses:
Ralph R. Duniway
Alpha A. Turner
Inventor,
Bert R. Amend
by T. J. Geisler
Atty.

UNITED STATES PATENT OFFICE.

BERT R. AMEND, OF PORTLAND, OREGON.

ARTIFICIAL HAND FOR PLAYING CHORDS.

No. 831,920.　　　　　Specification of Letters Patent.　　　　Patented Sept. 25, 1906.

Application filed October 31, 1905. Serial No. 285,279.

*To all whom it may concern:*

Be it known that I, BERT R. AMEND, a citizen of the United States, and a resident of Portland, county of Multnomah, and State of Oregon, have invented a new and useful Artificial Hand for Playing Chords, of which the following is a specification, reference being had to the accompanying drawings as a part thereof.

My invention has for its object to provide a device which may be affixed to the stump of an amputated arm or to the extremity of an artificial arm, so as to enable the person to play the chords or bass notes of an accompaniment on a piano or organ, or to enable the person to play an accompaniment in the form of chords with my attachment to a melody played with the other hand on the instrument.

It is further my object to so contrive my device as to make the same in its impact upon the keys of the instrument simulate the elastic touch of the human finger, and, furthermore, to make the device of simple construction as a whole.

I carry my invention into effect as illustrated in the accompanying drawings, in which—

Figure 1 is a perspective of my device. Fig. 2 is a section taken on a line extending longitudinally through one of the fingers. Fig. 3 shows a section of the extremity of an artificial arm adapted to have my attachment affixed thereto; and Fig. 4 shows a socket-bar—that is, a bar made with a socket to receive the shank or stud-screw of my attachment and provided with straps for affixing the same to the stump of an amputated arm.

Referring now to the letters and numbers in the several views, my device consists of a bar $a$, preferably made of metal tubing, so as to be as light as practicable. To the bar are rigidly affixed four finger-pins, as $b$, (shown in Fig. 2,) these pins preferably being made one-half of the length of the fingers 1, 2, 3, and 4. On the finger-pins $b$ are affixed spirals of steel spring-wire $c$, and each of said spirals is incased by a rubber casing $d$. The spring spirals $c$ of each finger are preferably made twice as long as the finger-pins $b$. The finger-pins $b$ give to the fingers 1, 2, 3, and 4 the required rigidity, while the spirals $c$ thereon secured adapt the fingers to simulate the elastic touch of the human finger in their impact on the keys of the instrument. The exterior rubber casing $d$ operates to prevent the fingers from slipping on the keys and also prevents the marring of the latter.

The fingers 1, 2, 3, and 4 of my device are relatively positioned so as to correspond with the notes included in the chord. For example, in playing the chord in the scale of C the second finger 2, referring to the notation 1, 2, 3, and 4 of the fingers as marked in Fig. 1, is placed on the key-note c of the chord, and the first finger 1 would strike the g below such c, and the third and fourth fingers 3 and 4 would strike the e and g above the c. To facilitate the playing of a white key when constituting a part of the notes of a chord in flats, I provide the bar $a$ with a fifth dependent finger 5. This consists of a stud $e$, which is secured in the under side of the bar $a$ in relative position, so that it may be used as follows: In playing the chord of the scale, a-flat, for example, the fingers of my device will be so positioned that the second finger 2 would impinge upon the key a-flat, the first finger 1 on e-flat, the fourth finger on e-flat above, while the third finger would not be thrown into action at all, and in place thereof the dependent fifth finger 5 would strike the white key c-natural. The necessity for this arrangement is obvious, for the third finger could not be conveniently brought down to strike the white key c-natural simultaneously with bringing the first, second, and fourth fingers down on the black keys of the instrument.

My device may be constructed so as to be adapted to be affixed to the stump of an amputated arm or to the extremity of an artificial arm. For either purpose the bar $a$ is provided with a screw-stud $f$. If my device is to be attached to an artificial arm, the stud $f$ of the bar $a$ would be inserted in the extremity of the artificial arm $g$, which is made with a screw-socket $h$. If my device is to be affixed to the extremity or stump of an amputated arm, I use a socket-bar $i$—that is, a bar made with screw-socket $i'$, adapted to have the stud $f$ secured thereto and made with a shank $j$, provided with straps $l\ m$ for securing the shank to the extremity of the amputated arm.

My chord-playing attachment as described is constructed for use in playing the notes comprised in the chord of any scale. It may also be as advantageously used for playing only the bass in the form of an octave of the key-note of the chord. For such purpose the middle two fingers 2 3 of my attachment would be omitted. If desirable, the middle two fingers may be removably affixed to the shank $a$ by the common screw-and-socket arrangement, so that one attachment will answer for both purposes.

In order to so arrange my device that the same may be compactly contained in a case, I prefer to make the fifth finger 5 and the stud-screw $f$ removable.

What I claim, and desire to secure by Letters Patent, is—

1. A device of the character described comprising a bar provided with four, relatively positioned, projecting fingers, made with resilient extremities, a dependent fifth finger, and means for attaching the bar to the arm.

2. A device of the character described comprising a bar provided with four, relatively positioned, projecting fingers, made with resilient extremities, a removable dependent fifth finger, and means for attaching the bar to the arm.

3. A device of the character described comprising a bar provided with four relatively positioned, projecting finger-pins, an elastic casing on each pin, said casing extending beyond the finger-pin so as to provide a resilient extremity therefor, a dependent fifth finger, and means for attaching the bar to the arm.

4. In a device of the character described the combination with a bar having four relatively positioned projecting finger-pins of a spiral of wire on each pin, said spiral extending beyond the pin and constituting the resilient extremity thereof, and casings inclosing the spirals.

In testimony whereof I have hereunto affixed my signature in the presence of two witnesses.

BERT R. AMEND.

Witnesses:
T. J. GEISLER,
ALPHA A. TURNER.